United States Patent [19]

Scaglia

[11] Patent Number: 4,557,659
[45] Date of Patent: Dec. 10, 1985

[54] DEVICE FOR SUPPORTING AND HANDLING LOADS BY MEANS OF VACUUM OPERATED SUCTION PADS

[75] Inventor: Mario Scaglia, Milan, Italy

[73] Assignee: M. Scaglia S.p.A., Brembilla, Italy

[21] Appl. No.: 527,734

[22] Filed: Aug. 30, 1983

[30] Foreign Application Priority Data

Sep. 14, 1982 [IT] Italy ............................. 22857/82[U]
Jan. 31, 1983 [IT] Italy ............................. 20655/83[U]
Jan. 31, 1983 [IT] Italy ............................. 20654/83[U]

[51] Int. Cl.⁴ .............................................. B66C 1/02
[52] U.S. Cl. ................................... 414/627; 254/270;
294/64.1; 294/65; 414/561
[58] Field of Search ............... 294/64 R, 65; 254/267,
254/270, 362; 414/561, 627

[56] References Cited

U.S. PATENT DOCUMENTS

| 2,823,896 | 2/1958 | Hood ................................... 254/270 |
| 2,941,675 | 6/1960 | Noble et al. ........................ 414/627 |
| 3,485,393 | 12/1969 | Wilder ........................ 294/64 R X |
| 3,734,325 | 5/1973 | Stone ............................ 294/64 R X |
| 3,756,563 | 9/1973 | Stone ............................ 294/64 R X |
| 3,933,388 | 1/1976 | Conboy ............................. 294/64 R |
| 3,976,205 | 8/1976 | Goransson ..................... 294/64 R X |
| 4,228,993 | 10/1980 | Cathers ............................. 294/65 X |

FOREIGN PATENT DOCUMENTS

| 2044910 | 3/1972 | Fed. Rep. of Germany .... 294/64 R |
| 923724 | 4/1963 | United Kingdom .................. 294/65 |
| 1028065 | 5/1966 | United Kingdom .................. 294/65 |
| 270231 | 8/1970 | U.S.S.R. ................................. 254/270 |
| 275337 | 10/1970 | U.S.S.R. ................................. 294/65 |
| 307036 | 8/1971 | U.S.S.R. ............................. 294/64 R |

Primary Examiner—Johnny D. Cherry
Attorney, Agent, or Firm—Wenderoth, Lind & Ponack

[57] ABSTRACT

A device can be applied to a lifting and/or transporting unit for the controlled support of loads by generating a vacuum in one or more suction pads. The device includes a vacuum gauge measuring the vacuum level in at least one of the suction pads and safely controlling movement of the device. A safety system prevents erroneous dropping of the suspended load. The suction pads for gripping the load can be mounted on a holding frame which can be changed and/or lengthened for accommodating various types of loads.

13 Claims, 9 Drawing Figures

DEVICE FOR SUPPORTING AND HANDLING LOADS BY MEANS OF VACUUM OPERATED SUCTION PADS

BACKGROUND OF THE INVENTION

1. Field of the Invention

The present invention relates to a device which can be applied to a lifting and/or transporting unit for controllably supporting and handling loads by generating a vacuum in one or more suction pads.

2. Description of the Prior Art

The operation of lifting and supporting a load by means of suction pads in contact with a surface of the loads and in which a vacuum is generated is a well known and used technique, especially, for transport purposes inside working areas and therebetween. Known devices of this kind are very simple and usually include, in addition to the suction pad(s) and a vacuum source, means for controlling the connection of the suction pads to the vacuum source or to atmosphere only.

However these known devices have various drawbacks, both during the load gripping step for lifting and transporting the load and during the latter operation. In fact, these known devices do not possess a control to ensure that a sufficient vacuum level has been reached within the suction pads at the time the operator leaves the load to the lifting and transporting unit to which the supporting device is applied. This leads to human errors and requires a certain skill by the operator who must operate the lifting and transporting unit only once a sufficient vacuum level has been reached within the suction pads, but without an excessive time delay for obvious productivity reasons.

However, the greatest drawback of the known supporting devices with suction pads is that they do not include a safety system against an uncontrollable rapid decrease of the absolute vacuum level within the suction pads during the load lifting and/or transporting operation. Such vacuum decrease can occur for various reason, particularly in case of failures of the vacuum generation and transmission system or else because of unforeseen porosity of the surface on which the suction pads are to be placed, or due to maneuvering errors by the operator who erroneously can depress the load release button while the load is still lifted or suspended.

Finally, another drawback of the known devices of this kind is that they have a fixed number of suction pads and/or a fixed arrangement thereof on the lifting tool, so that loads having different features cannot be accommodated by a single device. There are, for example, loads having a small thickness and a large surface which are to be transported edgewise and therefore require that the suction pads be applied to their side surfaces, or loads having uneven surfaces requiring the application of the suction pads at different levels, and so on. Therefore, these differences in the load features require the use of a different device which, of course, results in a lifting device inventory of remarkable costs.

SUMMARY OF THE INVENTION

Therefore, the object of the present invention is to provide a load supporting device of the above mentioned type, which obviates the above drawbacks of the known devices, while maintaining a very simple and inexpensive structure that will ensure the greatest possible safety for the operator as well as great versatility.

These characteristics are substantially attained in a device of the above mentioned kind in that it includes a vacuum gauge measuring the vacuum level within at least one of the suction pads, and at least one transducer to control at least one function of the lifting and/or transporting unit in response to the at least one vacuum level measured by the vacuum gauge.

Thus, it is possible to control different functions of the device, especially in such a manner that it will operate only when a preset vacuum level has been reached and, in case of a subsequent undesired vacuum drop below a preset level, it automatically will cause the load to be slowly lowered and/or an alarm signal to be produced.

DESCRIPTION OF THE PREFERRED EMBODIMENTS

Figure 1:
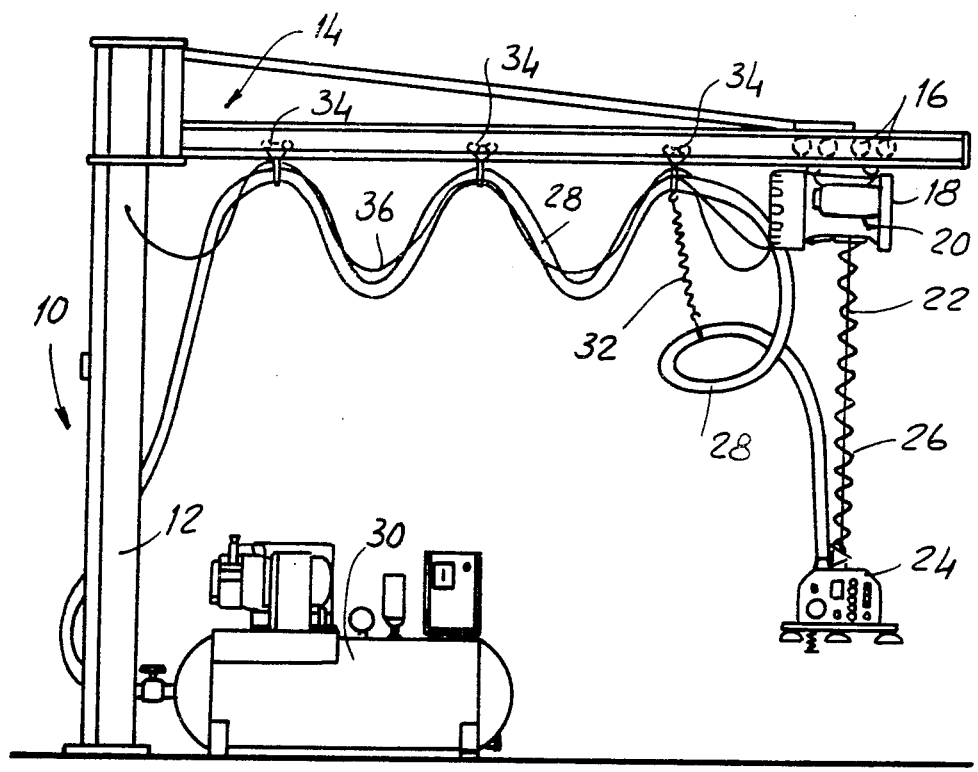
FIG. 1 is a diagrammatic showing of a device according to the invention as applied to a particular load balancing unit.

Referring first to FIG. 1, the device according to the invention can be applied to a lifting and/or transporting unit which, in the particular case here illustrated, includes equipment capable of balancing loads, generally indicated at 10 and including an upright 12 supporting an overhanging horizontal beam 14. A load balancing assembly 18 can longitudinally run on beam 14 by means of wheels 16, this assembly being known per se and substantially formed of an electric motor 20 delivering a balancing torque to a roller on which a lifting cable 22 is wound and intended to directly or indirectly support the load.

Typically, a device 24 according to the invention is applied to the lifting cable 22, which is electrically connected, through an electric cable 26, to the balancing assembly 18 as well as pneumatically connected, through a duct 28, to a vacuum unit 30 provided with a vacuum tank, known per se. Duct 28, which is held in position by a spring 32, is supported wound in loops by means of wheels 34 running along the beam 14 and supporting also an electric cable 36 supplying the balancing assembly 18.

Alternatively, instead of providing a separate vacuum unit with tank 30, this unit can be embodied within the balancing assembly 18. Of course, in this case, since the vacuum unit with tank is of smaller dimensions, smaller flow rate values can be reached and therefore only loads having even and nearly impermeable surfaces can be lifted or balanced, while having at all times the assurance that the vacuum in the suction pads slowly decreases in the case of a mechanical or power failure. As another alternative, the vacuum can be generated by a venturi operating with compressed air supplied by a compressor and this venturi could be located either in the balancing assembly 18 or even within the device 24.

Figure 2:
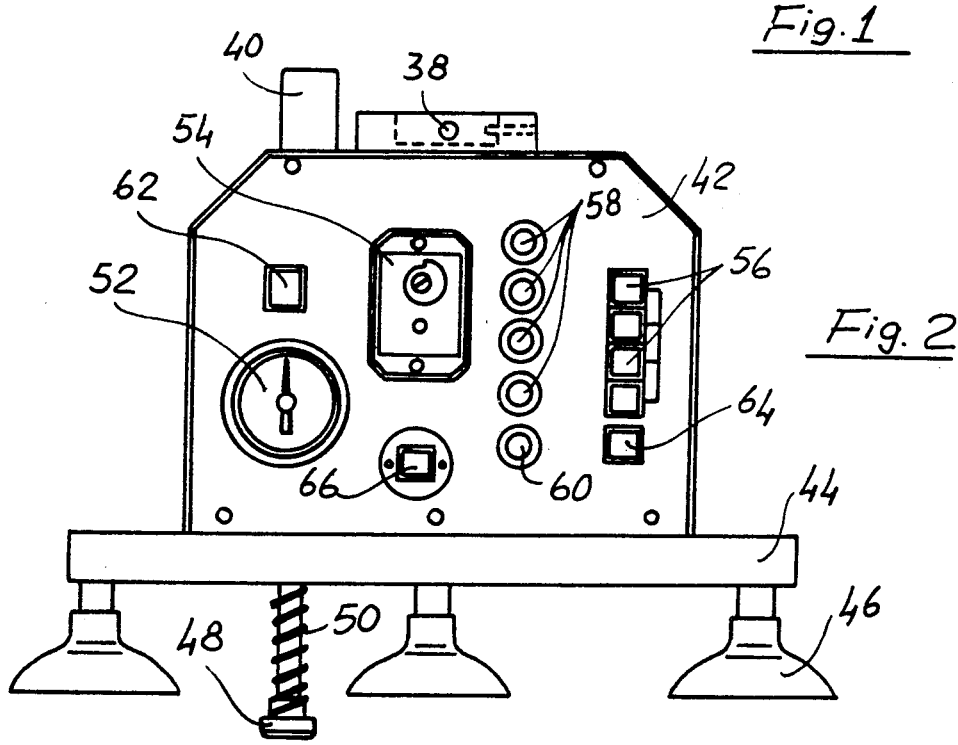
FIG. 2 is an enlarged view of the portion of the device of FIG. 1 which is designed to controllably support the load.
Figure 9:
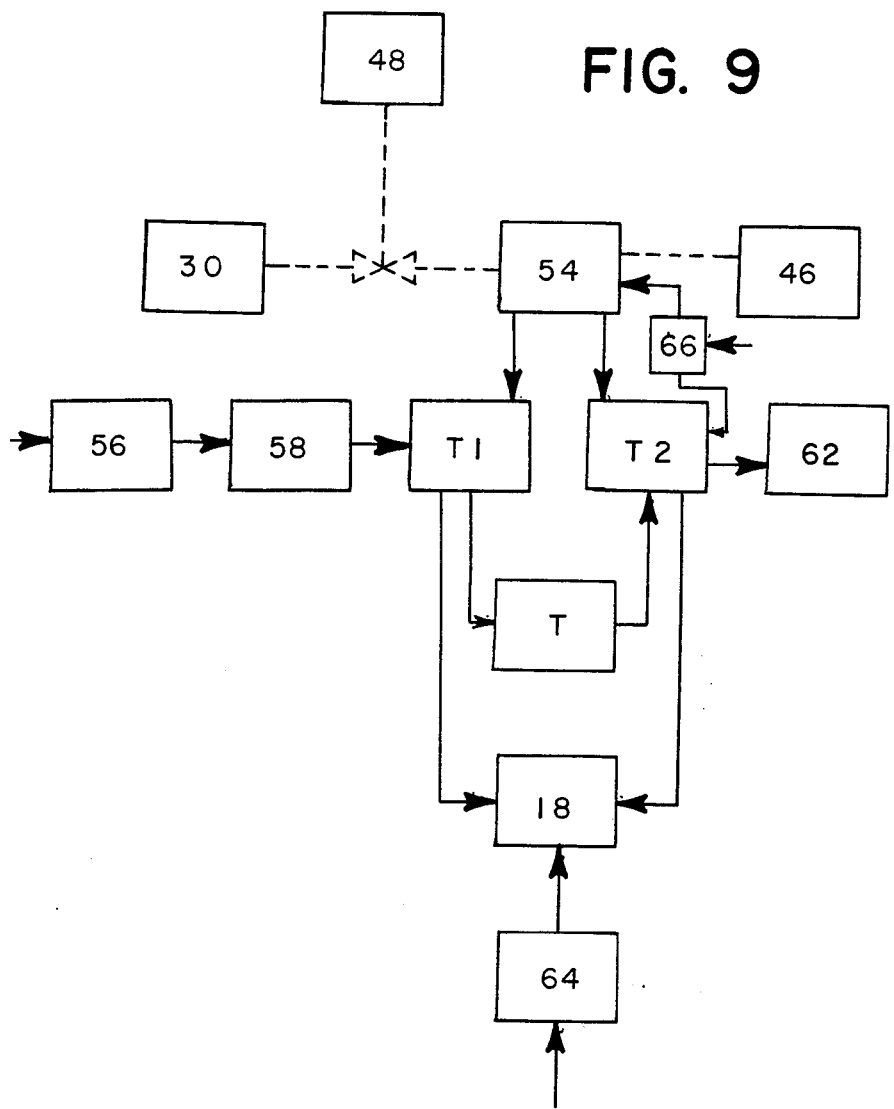
FIG. 9 is a circuit diagram of the device.

The device 24, illustrated in more detail in FIG. 2, is secured to the lifting cable 22 by screws 38 and is connected to the duct 28 by means of a plug 40. Its structural or body portion 42 includes controlling and operating elements for the various functions of the device 24 and equipment 10 and transmits the weight of the load from a frame 44 carrying suction pads 46 to the screws 38. The device includes also a sensor 48 depending from its bottom surface and extending beyond the suction pads 46 and held under the bias of a coilspring 50. The movement of sensor 48 causes a vacuum to be supplied into the suction pads 46. The level of this vacuum can be visually controlled by the operator at all times by means of a gauge 52 and is detected at all times by a vacuum gauge 54 capable of controlling, through one or more transducers, an equal number of functions of equipment 10 once preset vacuum levels have been reached within the suction pads 46. More particularly, and with reference to the circuit diagram of FIG. 9, as the vacuum gauge 54 indicates that a first vacuum level is reached, it supplies through a first transducer T1 an operating or controlling signal to the equipment 10, more particularly to the balancing assembly 18, which performs load balancing. In this particular case, the balancing occurs by means of a reaction force, the value of which is set by the operator depressing one of pushbuttons 56, controlling respective potentiometers 58 which can be calibrated to desired loads. Another potentiometer 60 controls the device weight balance.

Therefore, due to the first transducer T1, the vacuum gauge 54 automatically controls the operation of the balancing assembly 18 so that this balancing action exactly begins at the necessary time, namely, neither too early when an insufficient vacuum would be present, nor too late when a time loss would occur.

The vacuum gauge 54 also controls a second transducer T2 supplying another signal when the absolute vacuum level falls below another preset value, which is lower than the first mentioned level. This situation can occur when the device is operating under emergency conditions and there is the danger that the load might fall. In order to avoid this danger, the signal supplied by the second transducer T2 energizes an alarm member, a lamp 62 for example, and causes also slow load lowering so that the load comes to rest before the vacuum level within the suction pads falls below such a level that the load support is no longer assured. Of course, it is necessary that the second transducer T2 should operate after the vacuum level is increased during the load grip, which can be obtained by subjecting the second transducer T2 to an operating signal which takes into account a certain time delay, e.g. provided by a timer T, at the beginning of the suction operation, or else the fact that the first transducer T1 must be first operated, or eventually the fact that the absolute vacuum level is decreasing.

In case of a regular operation, and in order to release the device from the load, after the latter has been slowly lowered by acting with the hands on the frame 44 or by depressing a suitable push-button 64, it will be sufficient to depress a push-button 66 for causing suction pad release. Of course, this push-button 66 disconnects the second transducer T2 to avoid unnecessary alarm signals.

Figure 3:
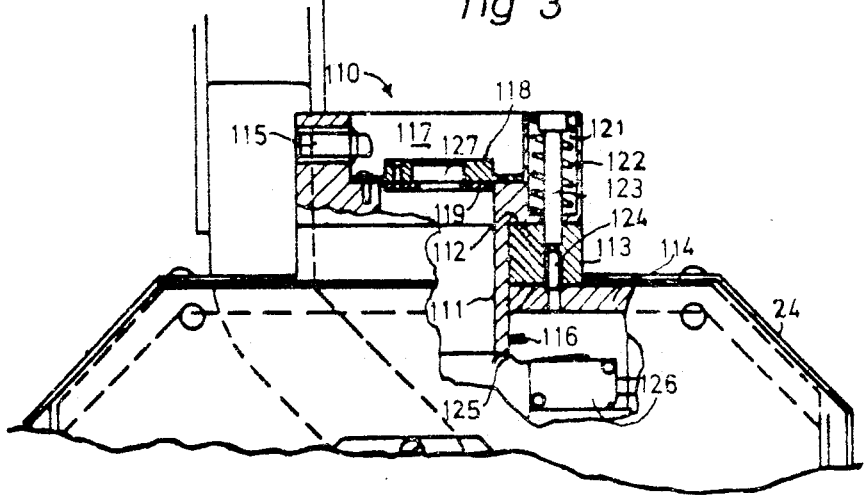
FIG. 3 is an elevation view, partially cut-away, of a detail showing a safety system against incidental load releases.

To provide safety against the erroneous or inadvertent depression of the push-button 66 by the operator when the device 24 is lifted from the ground, in which case the load held by the suction pads would automatically release and fall to the ground, the system illustrated in FIG. 3 is provided. It includes a cylindrical shaped body 110 having a portion 111 of smaller diameter forming with the body 110 a step 112. The smaller diameter portion 111 is fitted with clearance in a cylindrical frame 113 secured to a top wall 114 of the device 24. A stop element 116 is secured to the lower end of the smaller diameter portion 111, which element together with the abutting surface formed by the step 112, has the function of limiting the travel of body 110 within the cylindrical frame 113 secured to the lifting device 24.

The cylindrical body 110 is provided on the top with a cylindrical recess 117 intended to receive the lifting cable of the lifting and/or transporting unit, which is secured to the cylindrical body by screws 115.

Electrical connection is made through a connector 127 secured to the body 110 by means of a bridge 118 and a washer 119. The upper portion of the cylindrical body 110 is provided with axially extending recesses 121 receiving springs 122 resting at their lower ends on the recess bottoms and secured at their upper ends to pins 123 passing through the associated recesses and screwed at their inner ends in threaded holes 124 provided in the cylindrical frame 113. The pins 123 are thus fastened to the frame 113 and therefore to the device 24. The lower end of the cylindrical body normally contacts an arm 125 of a microswitch 126 connected to the various control elements in the device 24.

In the position shown in FIG. 3, the body 110 bears against the cylindrical frame 113 and in so doing it maintains the arm 125 of the microswitch 126 depressed, so that the microswitch 126 will be closed. As a load is applied to the suction pads and the lifting unit lifts the device 24 together with the load gripped thereto by the action of the vacuum within the suction pads, the body 110 is lifted with respect to the device 24 against the force of springs 122 until the stop element 116 contacts the top wall 114. In this condition, the arm 125 of microswitch 126 opens a circuit leading from the load release push-button 66 to the suction pads. When the device 24 is lifted and all the time it remains lifted with the load suspended therefrom, the body 110 of the safety system will remain spaced from the device 24 and will maintain therefore the microswitch 126 in an open position so that, if the operator should erroneously depress the load release push-button 66, this would act only on the slow load lowering control and not on the load release device so that the load will slowly be brought into contact with the ground. Once the load is at rest on the ground, a further lowering of the lifting cable will cause the body 110 of the safety system to be brought into contact with the frame 113 fastened to the device 24, both by gravity and by the force of springs 122. As the body 110 bears on the frame 113, the lower end of body 110 will depress the arm 125 of microswitch 126 so that the circuit leading from the load release push-button to the load releasing mechanism will be closed, thereby making this releasing mechanism active.

More particularly, as the body 110 is spaced from the device 24 and therefore the microswitch 126 is opened, the sensor 48 pressed by the load will communicate vacuum to the suction pads and will begin to lift the load. If the operator should depress the load release push-button, the latter instead of operating the release of the vacuum from within the sucton pads, will cause slow load lowering until the load is in contact with the ground, at which time the microswitch 126 is closed, thereby causing the vacuum to be released from the suction pads.

In order to provide versatility of the disclosed device, an interchangeable suction pad holder is provided, as best shown in FIGS. 4 to 8.

Figure 4:
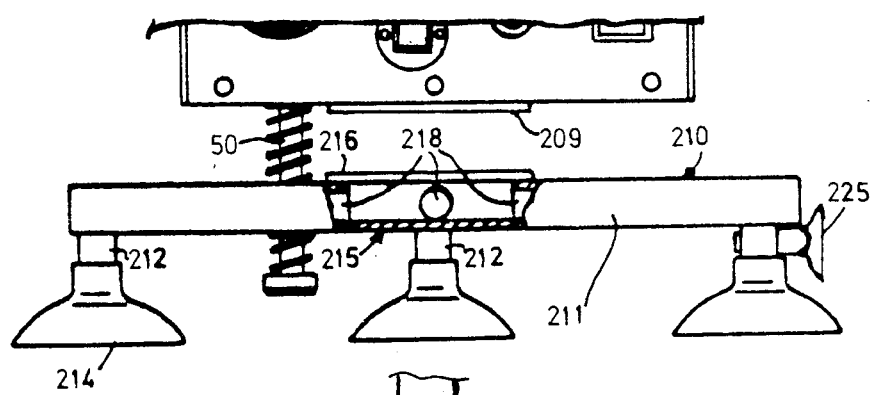
FIG. 4 is a partial side elevation view of the device of FIG. 1 provided with a suction pad holder, partially cut-away and removed from the device.
Figure 8:
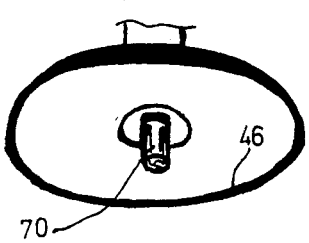
FIG. 8 shows a detail of a suction pad provided with a sensor.
Figure 6:
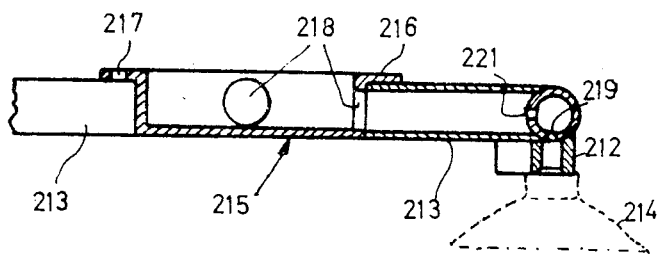
FIG. 6 is a sectional view taken along the line VI—VI of FIG. 5.
Figure 5:
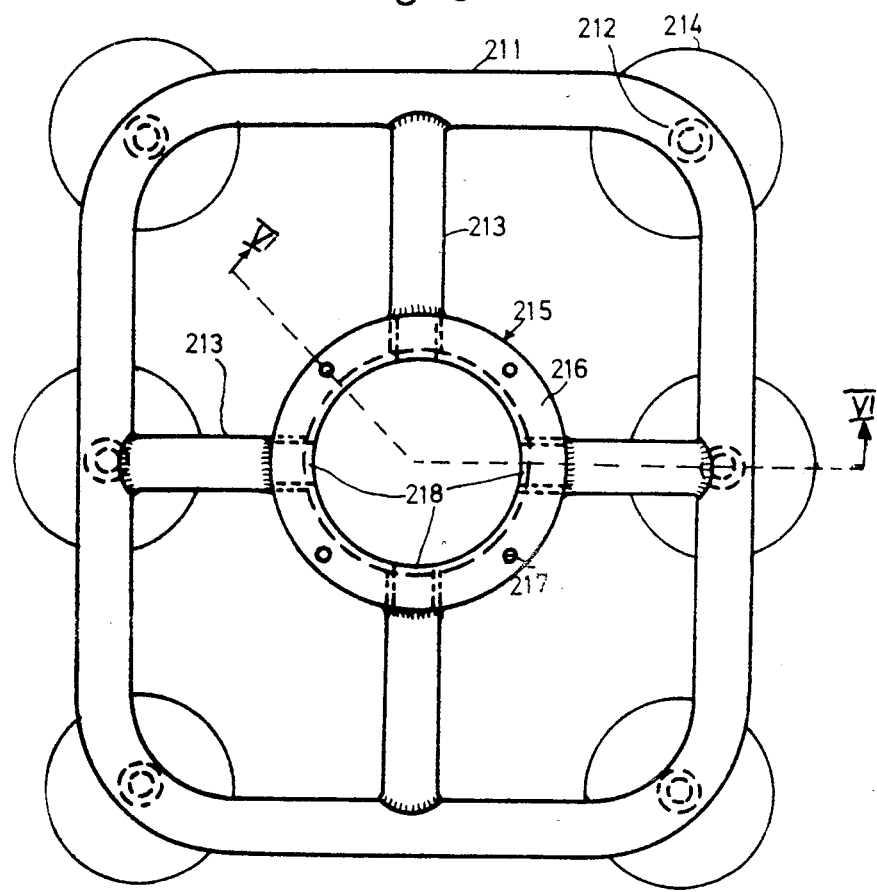
FIG. 5 is a top plan view of the suction pad holder.

As seen in FIG. 4, the bottom of the device 24 is provided with a suction nozzle 209. Connected to this nozzle is a suction pad holder 210 which is formed of a tubular frame 211 substantially rectangular in shape, which is provided at its corners and larger sides with connectors 212 for securing suction pads 214. These connectors are preferably attached to the holding frame 211 by welding. At the locations of connectors 212 the holding frame 211 is provided with holes 219 (FIG. 6).

The suction pad holder 210 includes a preferably cup-shaped manifold 215, having a flange 216 provided with holes 217 for securing the suction pad holder to the device 24. The manifold 215 is provided on its side wall with four holes 218 spaced apart by 90°, to each of which an end of a tube 213 is connected, the other end of which is welded to the frame 211 having in these locations holes 221 for communicating the tubes 213 to the frame 211.

The so formed suction pad holder is of a particularly strong and rigid structure, capable of supporting the weight of the load to be lifted with a remarkable degree of safety and of instantaneously communicating the vacuum to all the suction pads 214 through the holes 218 of the manifold 215, the tubes forming the frame 211 and the connectors 212. In this manner the vacuum is communicated to all the suction pads so that the load to be lifted can be firmly gripped by the six suction pads secured to the frame 211. By the provision of cutoff cocks 225 in the suction pad connectors 212 it is possible to disconnect from the vacuum source the suction pads not necessary for use so that the device 24 can operate with four or two suction pads. This is advantageous where the weight of the load to be lifted is light, thereby avoiding sources of potential vacuum loss.

Alternatively, a valve or sensor 70 for each suction pad 46 (FIG. 9) can be provided, which is normally held in a closed position in which the vacuum is cutoff, each suction pad being provided with an associated control element opening the valve when the associated suction pad contacts the load to be lifted.

As a further alternative, the tubular frame 211 can include valving means cutting off one or more suction pads and operated by control elements provided within device 24.

Figure 7:
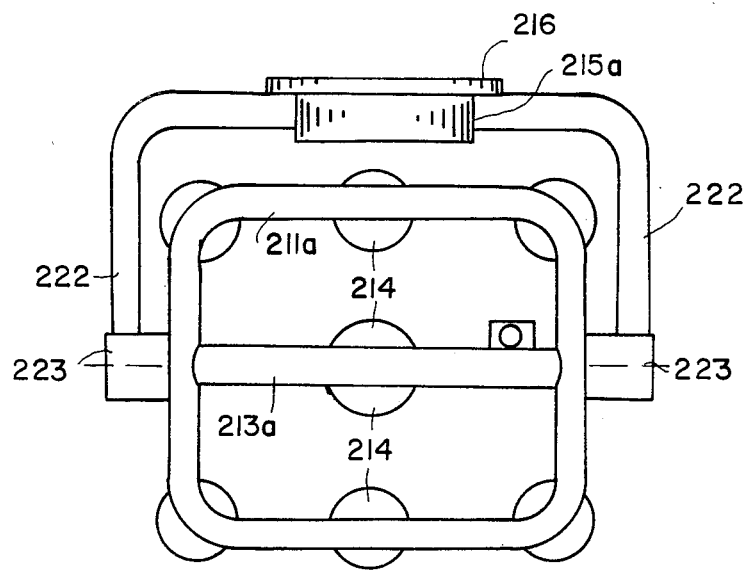
FIG. 7 is a side elevation view of the suction pad holder having the suction pads secured to a frame pivotally mounted to a seat receiving a suction nozzle.

In FIG. 7 a suction pad holder is shown, the frame 211a of which is secured to the manifold 215a in a rotatable manner. To this end, the frame 211a has along its center line a tube 213a provided with a suction pad 214 and in communication with the other tubes forming the frame. The manifold 215a is provided with a pair of tubes 222 exiting from opposite ends and extending to center pins 223 whose function is to rotatably and tightly mount the frame 211a of the suction pad holder.

This suction pad holder lends itself very well to lift loads having a small thickness and a large surface, for instance iron sheets, where the suction pad holder must be applied on the lateral surfaces of the sheets for transport convenience.

Many changes and modifications can be made to this invention, and specifically one or more components which are housed within the device could be located within the balancing assembly 18 in order to reduce the extra weight to be lifted.

I claim:

1. In a lifting and/or transporting apparatus for lifting and controllably supporting a load by vacuum, said apparatus being of the type including a device supporting at least one suction pad adapted to sealingly contact a load to be lifted, means for connecting a source of vacuum to said suction pad to cause said suction pad to grip the load, means for lifting said device, and means mounted on said device for selectively releasing the vacuum in said suction pad and thereby releasing the load, the improvement wherein said device comprises:

means for measuring the vacuum in said suction pad;
   means, operable in response to measurement by said measuring means, for controlling the operation of said lifting means;
   a body connected to said lifting means and mounted to extend into said device for vertical movement relative thereto;
   biasing means operable for urging said device in a first direction relative to said body into a first position in abutment therewith;
   whereby, in the absence of a load and upon operation of said lifting means, said biasing means urges said device into said first position, and upon the presence of a load and operation of said lifting means, said device moves by the weight of the load in a second direction opposite to said first direction and away from abutment with said body; and
   said body including means for, upon said device being moved in said second direction, interrupting operation of said releasing means and thereby for preventing a lifted load from being released inadvertently, said interrupting means being inoperable when said device is in said first position in abutment with said body.

2. The improvement claimed in claim 1, wherein said controlling means comprises first transducer means for operating said lifting means to raise said device when the vacuum measured by said measuring means is at a first level, and second transducer means for operating an alarm when the vacuum measured by said measuring means is at a second level lower than said first level.

3. The improvement claimed in claim 2, wherein said second transducer means further is operable to cause said lifting means to slowly lower said device upon measurement by said measuring means of said second level.

4. The improvement claimed in claim 2, further comprising timer means for retarding operation of said second transducer means for a predetermined time period after measurement by said measuring means of said second level.

5. The improvement claimed in claim 1, further comprising stop means on said body for limiting movement of said device in said second direction.

6. The improvement claimed in claim 1, wherein said body includes a smaller size portion extending into said device and a larger size portion abutting said device in said first position, said smaller and larger size portions defining therebetween a step.

7. The improvement claimed in claim 6, wherein said biasing means comprise vertical recesses in said larger size portion of said body, bolts extending into said recesses and having inner ends threaded into said device, and compression springs surrounding said bolts and compressed between inner ends of said recesses and outer ends of said bolts.

8. The improvement claimed in claim 1, wherein said releasing means includes a microswitch having an actuating arm in engagement with said body.

9. The improvement claimed in claim 1, further comprising a pad holder removably mounted on said device and supporting a plurality of said suction pads, said pad holder comprising a vacuum manifold, means for removably connecting said manifold to said device with said vacuum source connected to said manifold, a tubular frame connected to said manifold with the interior of said frame in communication with said manifold, and connectors mounting said pads on said frame and communicating with said interior.

10. The improvement claimed in claim 9, further comprising valve means for selectively interrupting communication of vacuum to selected said pads.

11. The improvement claimed in claim 10, wherein said valve means are located at said connectors.

12. The improvement claimed in claim 10, wherein said valve means comprise control elements in said pads operable to open communication to said source upon said pads contacting a load to be lifted.

13. The improvement claimed in claim 9, wherein said tubular frame is pivotally connected to said manifold.

* * * * *